United States Patent Office 3,243,086
Patented Mar. 29, 1966

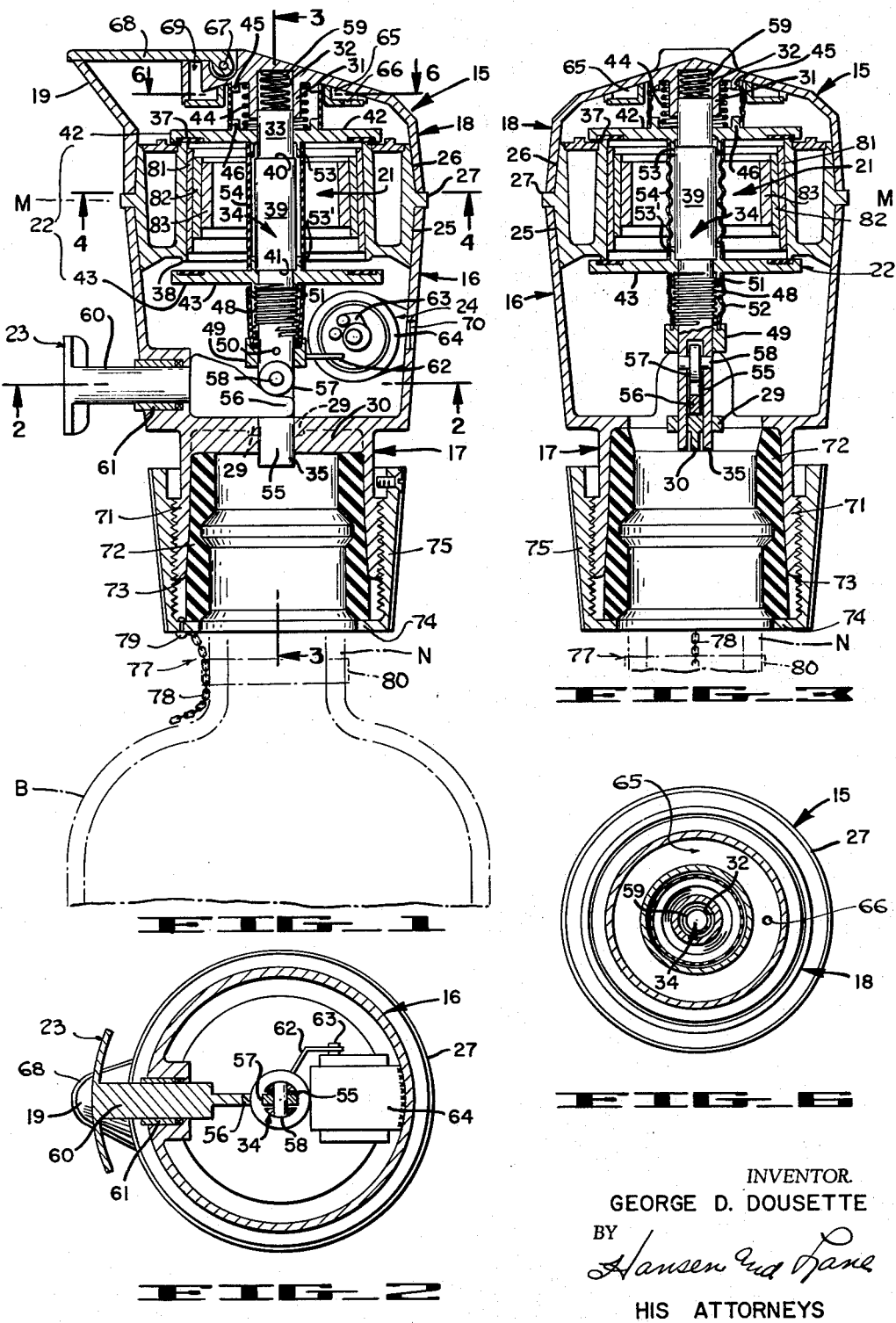

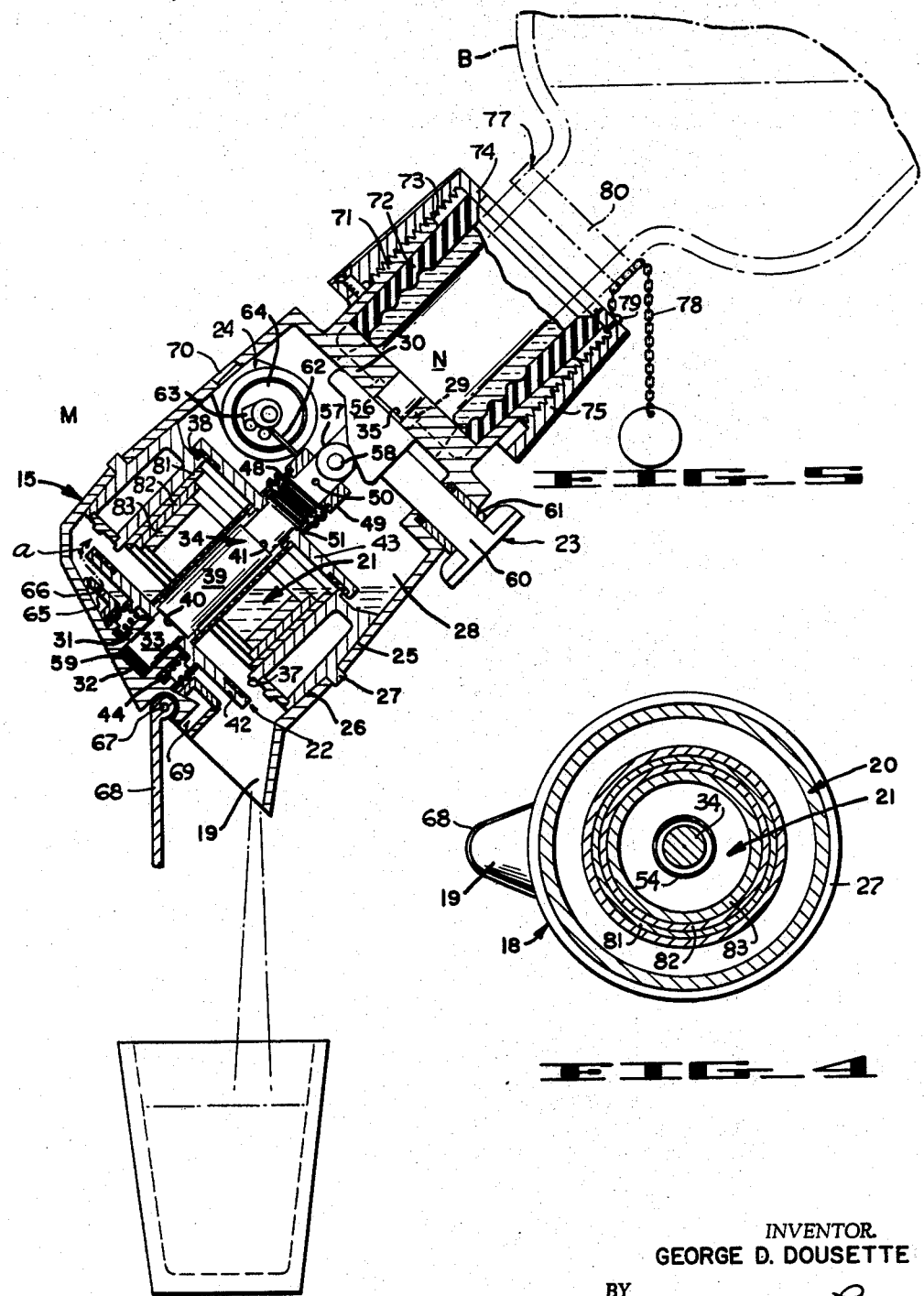

3,243,086
LIQUID DISPENSING DEVICE HAVING A TRAP CHAMBER AND VALVES THEREFOR
George D. Dousette, 1749 Linnet Lane, Sunnyvale, Calif.
Filed Nov. 27, 1964, Ser. No. 414,376
6 Claims. (Cl. 222—447)

This invention relates to a liquid measuring and counting device in the nature of a cap or bottle top and means detecting removal thereof from the bottle.

As in all of such devices of this general character it is an object to provide a mechanism by which to dispense a metered quantity of fluid from a bottle and to count and total the number of such quantities as they are metered out.

The present invention has as one of its objects to provide a compact metering dispenser which is simple in construction, economical to manufacture and highly efficient in use.

It is another object of this invention to provide a hollow body confining a measuring chamber flanked by valves on a common stem and means for actuating such valves in sequence to effect the dispensing operation. In connection with the foregoing it is a further object to provide a unidirectional actuated stem for isolating a metered quantity of fluid and subsequent dispensing thereof followed by a reverse operation of the valves for refilling the measuring chamber and isolating metered quantities in sequence.

It is yet another object to provide a measuring chamber for a metering dispenser with inserts interrelatable for changing the volumetric capacity of such metering chamber by displacement in a simple yet effective manner.

These and other objects and advantages of the present invention will become apparent from a reading of the following description and claims in the light of the drawings in which:

FIG. 1 is a vertical section through a bottle top dispenser embodying the present invention.

FIG. 2 is a horizontal section through FIG. 1 looking upwardly along line 2—2 thereof.

FIG. 3 is a vertical section taken through FIG. 1 along line 3—3 thereof with parts in a slightly different position.

FIG. 4 is a horizontal section through FIG. 1 looking upwardly along line 4—4 thereof.

FIG. 5 is a section similar to that of FIG. 1 positioned to pour a measured quantity of liquid.

FIG. 6 is a horizontal section through FIG. 1 taken along line 6—6 thereof.

Referring to the drawings a dispensing bottle top generally designated 15 has a main body 16 having a base end 17 adapted to sealingly fit over the neck N of an open bottle B and a cap 18 at the upper end of such main body is provided with a pouring spout 19.

The main body 16 is provided with an internal member 20 providing a chamber 21 for measuring a predetermined volume of liquid and valve means 22 associated with manually operated means 23 functioning to evacuate such chamber 21 in timed relation to a counter 24 whereby to record each pouring operation.

The present invention is embodied in the measuring feature and the means for operating the same. Specifically the main body 16 and the cap 18 taper toward a meeting line M and are secured together upon tapering side walls 25 and 26 on the internal member 20 and bear against an annular flange 27 formed externally on the latter. The parts 16, 18 and 20 are cemented together to form a complete hollow housing 28 with the measuring chamber 21 secured axially thereof.

The main body 16 is formed integrally with the base end 17 at the terminal end of the tapered main body.

At this juncture the base 17 and main body 16 are in communication with each other but provided with a central hub 29 supported between diametrically opposed spokes 30 which are an integral part of the base 17 and main body 16.

The cap 18 is likewise provided with a central bushing 31 formed within the housing 28 and providing a recess 32 for guidingly receiving one end 33 of a valve stem 34. The opposite end 35 of the valve stem 34 is guided in the hub 29 so that the stem 34 can move axially of the housing 28 and through the measuring chamber 21.

The measuring chamber 21 is in the form of a cylindrical shell 36 within the internal member 20 and is provided with upper and lower valve seats 37 and 38 which extend as annular lips around the extreme ends of the cylindrical shell 36. The valve stem 34 has an enlarged portion 39 providing shoulders 40 and 41 at its opposite ends. These shoulders 40 and 41 are spaced from each other a distance slightly less than the distance between the upper and lower valve seats 37 and 38 on the fixed cylindrical shell 36.

Each end of the stem 34 has a valve closure in the form of a disc 42 and 43 mounted thereon, one above and the other below the upper and lower valve seats 37 and 38, respectively. The upper disc 42 is urged by a compression spring 44 against the upper valve seat 37 to normally close the upper end of the measuring chamber 21. The spring 44 circumscribes the stem 34 as well as the central bushing 31 on the cap 18. Each end of the spring 34 is seated within a recess formed on the disc 42 and the cap 18 by means of identical annular flanges 45–46. A rubber or other tubing 47 has its open ends mounted or sealingly secured to the flanges 45–46 to keep liquid from entering.

The lower disc 43 is urged against the adjacent shoulder 41 on the stem 34 by means of a compression spring 48 having its opposite end resting on a collar 49 secured by a pin 50 to the stem 34. The spring rests in a recess formed on the disc 43 by an annular wall 51. A latex rubber tube 52 has one end secured to the annular wall 51 and its opposite end secured to the collar 49 to keep fluid from entering around the spring 48. The upper and lower discs 42 and 43 each have a tubular extension 53–53' formed thereon, facing each other and to fit and receive the enlarged portion 39 of the stem 34. A flexible tubular member 54 preferably made of latex rubber has its ends sealingly secured to the tubular extensions 53–53'. The tubular member 54 is of a length comparable to the maximum spacing of the discs 42 and 43 from each other and is disposed to collapse freely when these discs move together to their other limit of movement close to each other.

The end 35 of the valve stem 34 is provided with a groove 55 into which a cam member 56 extends. A roller 57 is journaled on a pin 58 extending across the groove 55 to support the roller 57 therein in engagement with the cam surface of the cam member 56. The other end 33 of the valve stem 34 is engaged by a compression spring 57 confined in the recess 32 in the cap 18. In this manner the valve stem 34 is constantly urged toward the cam member 56 and the roller 57 thereby maintained in engagement with the cam surface. This is the normal or initial position of the valve stem 34 when the device is standing free.

When the stem 34 is in the normal position just explained, the enlarged portion 39 is disposed in one extreme position in which the shoulder 40 is spaced from the upper disc 42 and the latter pressed by spring 44 into closed condition against the upper valve seat 37 of the chamber 21. At that time the stem 39 is under the pressure of spring 59 and the lower shoulder 41 thereby urged into engagement with the lower disc 43. The lower disc 43 is thus maintained in its extreme open position relative to the lower valve seat 38 of chamber 21. Each of the valve discs 42 and 43 have suitable resilient sealing material secured thereto in the region of their engagement with the respective valve seat 37 and 38.

While the parts are thus disposed in normal position the liquid will flow by gravity into the dispensing cap 15 when the bottle is tilted as shown in FIG. 5. The liquid passes through the neck of the bottle directly into the lower or entrance region of the hollow housing 28. The liquid flows through the opening between the lower valve disc 43 and valve seat 38 and into the measuring chamber 21. The opposite end of the chamber 21 is sealed closed by the valve disc 43. No liquid flows from the measuring chamber and the liquid is merely trapped within the chamber 21.

The pouring operation is accomplished by pressing a manually operated plunger 60. This plunger 60 is connected to the cam member 56 and extends radially therefrom through a packing gland 61 at one side of the main body 16. The pressure of the roller 57 upon the surface of cam 56, under the influence of compression spring 59 upon the valve stem 34, urges the plunger 60 outwardly relative to the main body 16. When the plunger 60 is pressed inwardly the cam 56 is shifted through the slot 55 in stem 34 to urge the roller 57 and stem 34 toward the cap 17 against the action of the spring 59.

The movement of the stem 34 under the influence of the plunger 60 affects several distinct actions in sequential order. *First*, it raises the lower valve disc 43 into closed sealed condition against the valve seat 38. The parts become arranged as illustrated in FIG. 3. *Second*, as the valve disc 43 ceases moving the valve stem 34 continues whereby the shoulder 41 on the enlarged portion 39 of stem 34 moves away from the disc 43. Since the enlarged portion 39 is of slightly lesser length than the depth of the measuring chamber 21, the upper valve disc 42 remains in closed position against the upper valve seat 37 although the stem 34 continues to move.

The collar 49 also continues to move with the stem 34 thus compressing the spring 48 between the collar and the lower disc 43. At this time a lateral arm 62 on the collar 49 engages and is about to operate a dog leg lever 63 on a counting device 64. *Third*, upon continued movement of the stem 34 during further depression of the plunger 60 the collar 49 becomes almost fully compressed, the spring 48 and the lateral arm 62 actuates the counter 64. Simultaneously, therewith the upper shoulder 40 on the enlarged portion 39 engages the upper disc 42 to move the latter off of the upper valve seat 37 against the action of the spring 44. At this time the spring 49 at the upper end of the valve stem becomes fully compressed.

The chamber 21 is thus opened to communicate with the interior of the cap 18 and the isolated measured quantity of liquid pours from the chamber 21 and out of the cap by way of the spout 19. During evacuation of the chamber 21 it will be appreciated that a venting action takes place. The venting action is accomplished through a venting chamber 65 provided in the cap 18.

The venting chamber 65 is molded with the cap 18 and comprises an annular compartment isolated from the interior of the cap 18 except for a small venting port 66 which is diametrically opposite the spout 19. That portion of the venting chamber 65 which is adjacent the spout 19 conceals the hinge 67 of a lid 68, the lid being pivotally connected to the cap so as to cover the open top of the spout 19. By this arrangement air enters the venting chamber 65 via a passage 69 beneath the lid and out of the line of flow of the liquid as it passes from the metering chamber 21 to the spout 19.

The venting port 66 being diametrically opposite the spout and guarded by the upper valve disc 42 venting air is free to pass in the direction of the arrow *a*, FIG. 5, into the non-filled zone of the hollow housing 28 and the high zone of the measuring chamber 21 to allow the fluid to flow fully from the latter toward the pouring spout.

Assuming now that the bottle and device 15 remain tilted for pouring as illustrated in FIG. 5 and another glass placed under the spout 19, by releasing the plunger 60 a reverse sequence of operation takes place as follows: As the roller 57 follows the declivity of the cam 56 the spring 59 returns the stem 34 toward normal with result:

1. The upper valve disc 42 closes the open upper end of the measuring chamber 21 by engaging the valve seat 37, the lower valve disc 43 remaining in contact with the lower seat 38.

2. The enlarged portion 39 of stem 34 next unseats the lower valve disc 43 from the seat 38 whereupon the fluid from the bottle will immediately recharge the measuring chamber 21, the air in the latter venting into the lower part of the housing 28 and thence into the bottle B.

The measuring chamber 21 is now full of fluid and upon depression of the plunger 60 the lower valve disc 43 closes first to isolate the correct volume of fluid in the chamber 21 before the upper valve disc 42 is unseated to allow the fluid to flow toward and out of the pouring spout as explained above.

In connection with the foregoing it will be appreciated that upon each depression of the plunger 60 the dispensing of each quantity of fluid from the device will be recorded on the counter 64. The counter 64 has digital drums readable through a window 70 from the exterior of the body 16. In this manner an accurate accounting is made of each operation of the device whereby the proprietor of an establishment has a way of checking on the number of drinks dispensed from the bottle.

As previously mentioned the base end 17 of the main body 16 is adapted to sealingly fit the open neck N of a bottle. The base end 17 of the main body 16 has a cylindrical portion 71 of larger diameter than the neck of a conventional bottle. This cylindrical portion 71 is lined with a rubber sleeve 72 by a press fit and the sleeve 72 is yieldable to be pressed over the neck of a bottle. The sleeve 72 extends beyond the lower end 73 of the portion 71 for engagement by an inturned flange 74 of a cap 75 which is threadably connected to the threading 76 on the exterior of the cylindrical portion 71. When the cap 75 is tightened up onto the threading 76 the inturned flange 74 is moved toward the extended end of the rubber sleeve 72 to compress the latter and thus bind the same and the base end 17 and to provide a liquid tight seal between the latter and the neck of the bottle.

For indicating whether or not the dispensing top 15 has been removed from a bottle without permission from the proprietor a novel detector means 77 is provided. This means 77 comprises a chain 78 having one end riveted to the inturned flange 74 as at 79 and a special tape 80 wound about the neck of the bottle and the chain 78 so that the threaded cap 75 cannot be unscrewed from the threads on the cylindrical portion 71 without tearing or breaking the tape 80.

In connection with the measuring chamber 21 of the present invention it is contemplated that means be provided for conditioning the dispenser for measuring any desired quantity of fluid within a range. In FIGS. 1, 3, 4 and 5 there is shown a plurality of cylindrical inserts each of which is calculated to displace a predetermined quantity within the chamber 21. The chamber 21 as formed in the internal member 20 provides the greatest capacity, namely, a chamber capable of holding 1 ounce of fluid.

The cylindrical wall of the chamber formed within the internal member 20 is tapered from the lower seating end 38 toward the upper seating end 37. Each cylindrical insert is likewise tapered so that one fits into the other to firmly secure itself within the next larger segment of the chamber. The taper is funnel-like from the bottle side toward the spout side of the dispenser. More specifically the first cylindrical insert 81 is of a length and wall thickness to reduce the internal capacity of the chamber by one eighth of an ounce. The second cylindrical insert 82 is shorter than the first (81) but has a greater wall thickness to displace another ⅛ ounce of fluid. The next cylindrical insert is of still shorter length than the second (82) but has a thicker wall to displace another ⅛ fluid ounce within the chamber.

By the foregoing arrangement there is provided a simple yet effective means for varying the capacity of the measuring chamber 21 without requiring machining or alteration of the dispensing device as constructed. The proprietor need only decide what quantity of fluid is to be dispensed and place the necessary inserts or leave them out as desired. The fixed measuring chamber 21 remains in the same relation to the valve seats and valve discs. All of the springs for operating the valve discs and valve stem are suitably sealed from exposure to the fluid by the rubber boots confining them. The operation is simple, instantaneous and affords an accurate account for each operation.

Having thus described the liquid dispensing device of the present application in specific detail it will be appreciated by those skilled in the art that the same may be susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. In a beverage dispenser of the type having a bottle connectable base and a spouted cap spaced from the bottle by a measuring chamber having valve seats at its upper and lower ends and a valve stem disposed for reciprocation axially of said chamber with upper and lower spring loaded valve discs so disposed on said valve stem that each alternately engage their respective valve seat during measuring, isolating and discharging liquid from the bottle; the improved structural characteristics therefor comprising in combination:
   (1) a hub formed on such base for receiving and guiding the lower end of such valve stem,
   (2) a bushing formed in said cap and having an internal recess for supporting the upper end of said valve stem co-axially of said hub,
   (3) the spring means for the upper valve disc having its upper end circumscribing said bushing and engaging said cap for normally urging the upper valve disc into closed position upon its valve seat,
   (4) a spring in the recess of said internal bushing for urging said valve stem toward said base independently of the upper valve disc and spring means therefor,
   (5) said stem having a split lower end, and
   (6) a thumb actuated plunger mounted for movement radially in said base and having a cam on its internal end guided for sliding movement in the split lower end of said stem for elevating said stem against the action of the spring in said recess.

2. The device in accordance with claim 1 including means for isolating all of said spring means from the liquid flowing through said dispenser comprising;
   (1) a liquid impervious flexible tube on the valve stem and having its ends secured to each of the valve discs thereon, and
   (2) a liquid impervious flexible tube confining each of the spring means associated with each of the valve discs.

3. The device in accordance with claim 2 in which one of said last named impervious flexible tubes has its upper end sealingly secured to said cap and its lower end sealingly secured to the upper valve disc.

4. In a beverage dispenser of the type having a bottle connectable base and a spouted cap spaced from the bottle by a measuring chamber having valve seats at its upper and lower ends and a valve stem disposed for reciprocation axially of said chamber with upper and lower spring loaded valve discs so disposed on said valve stem that each alternately engage their respective valve seat during measuring, isolating and discharging liquid from the bottle; the improved structural characteristics therefor comprising in combination:
   (1) a hub formed on such base for receiving and guiding the lower end of such valve stem,
   (2) a bushing formed in said cap and having an internal recess for supporting the upper end of said valve stem co-axially of said hub,
   (3) the valve stem having an enlarged medial portion providing shoulder formations in spaced relation to each other a distance slightly less than the distance between the valve seats at the upper and lower ends of the chamber,
   (4) the spring means for the upper valve disc having its upper end circumscribing said bushing and engaging said cap for normally closing the upper valve disc upon its valve seat,
   (5) a spring in the recess of said internal bushing for urging said valve stem toward said base independently of the upper valve disc and spring means therefor and for urging the lower shoulder portion of said stem beyond the lower valve seat of the chamber to normally open the lower valve disc relative to its valve seat,
   (6) said stem having a split lower end and a roller mounted for rotation therein, and
   (7) a thumb actuated plunger mounted for movement radially in said base and having a cam on its internal end guided for sliding movement in the split lower end of said stem for elevating said stem to close the lower valve disc and open the upper valve disc in sequence.

5. The device in accordance with claim 4 including means for isolating all of said spring means from the liquid flowing through said dispenser comprising:
   (1) a liquid impervious flexible tube on the valve stem and having its ends secured to each of the valve discs thereon, and
   (2) a liquid impervious flexible tube confining each of the spring means associated with each of the valve discs.

6. The device in accordance with claim 5 in which one of said last named impervious flexible tubes has its upper end sealingly secured to said cap and its lower end sealingly secured to the upper valve disc.

References Cited by the Examiner

UNITED STATES PATENTS

| 941,760 | 11/1909 | Cordley | 222—446 |
| 1,271,838 | 7/1918 | Billings | 222—446 X |
| 2,199,312 | 4/1940 | Henry | 222—447 |
| 2,875,927 | 3/1959 | Tufford et al. | 222—438 |

RAPHAEL M. LUPO, *Primary Examiner.*

HADD S. LANE, *Examiner.*